United States Patent
Rastogi et al.

(10) Patent No.: US 7,793,138 B2
(45) Date of Patent: Sep. 7, 2010

(54) ANOMALY DETECTION FOR STORAGE TRAFFIC IN A DATA CENTER

(75) Inventors: Gaurav Rastogi, Mountain View, CA (US); Rajesh Bhandari, San Jose, CA (US); Samar Sharma, Sunnyvale, CA (US); Fabio Maino, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 546 days.

(21) Appl. No.: 11/316,026

(22) Filed: Dec. 21, 2005

(65) Prior Publication Data

US 2007/0143552 A1 Jun. 21, 2007

(51) Int. Cl.
*G06F 11/00* (2006.01)
(52) U.S. Cl. .................. 714/4; 714/47; 726/22
(58) Field of Classification Search ............ 714/4, 714/5, 47; 726/22
See application file for complete search history.

(56) References Cited

U.S. PATENT DOCUMENTS

| | | | | |
|---|---|---|---|---|
| 6,058,494 | A * | 5/2000 | Gold et al. ............ | 714/42 |
| H1860 | H * | 9/2000 | Asthana et al. ........ | 379/9 |
| 6,138,159 | A * | 10/2000 | Phaal ................... | 709/226 |
| 6,182,197 | B1 | 1/2001 | Dias et al. | |
| 6,336,157 | B1 * | 1/2002 | Carbonaro et al. ..... | 710/59 |
| 6,529,784 | B1 * | 3/2003 | Cantos et al. .......... | 700/79 |
| 6,598,174 | B1 * | 7/2003 | Parks et al. ............ | 714/6 |
| 6,609,213 | B1 * | 8/2003 | Nguyen et al. ......... | 714/4 |
| 6,636,981 | B1 * | 10/2003 | Barnett et al. .......... | 714/4 |
| 6,681,310 | B1 | 1/2004 | Kusters et al. | |
| 6,704,874 | B1 * | 3/2004 | Porras et al. ........... | 726/22 |
| 6,708,212 | B2 * | 3/2004 | Porras et al. ........... | 709/224 |
| 6,711,615 | B2 * | 3/2004 | Porras et al. ........... | 709/224 |
| 6,738,818 | B1 * | 5/2004 | Shah .................... | 709/228 |

(Continued)

OTHER PUBLICATIONS

EMC2 and Fujitsu Siemens Computers, Global Recovery Demonstration: SRDF/A and Primecluster-EMC Remote Data Facility/Asynchronous Fujitsu Siemens Computers Primecluster, Feb. 2004, pp. 1-26.

(Continued)

*Primary Examiner*—Robert Beausoliel
*Assistant Examiner*—Joshua P Lottich
(74) *Attorney, Agent, or Firm*—Weaver Austin Villeneuve & Sampson LLP

(57) ABSTRACT

Disclosed are methods and apparatus for detecting anomalies in a storage area network (SAN). Provided are one or more anomaly type(s) and corresponding actions to be performed when the one or more anomaly types are detected. Traffic in the SAN is then inspected in order to detect the one or more provided anomaly type(s). When a one of the provided one or more anomaly type(s) is detected, one or more of the corresponding action(s) is performed. The provided anomaly type (s) may include one or more of the following: a read or write access pattern anomaly, excessive login or control requests, a bandwidth usage anomaly, a configuration anomaly, and a hardware anomaly. The provided corresponding actions may include logging and/or publishing the detected anomaly, enabling capture of the detected anomaly by an analysis device, re-authentication of a host that is responsible for the anomaly, disable access control for a host that is responsible for the anomaly, rate control of an anomalous link, and shut down of an anomalous link.

39 Claims, 8 Drawing Sheets

U.S. PATENT DOCUMENTS

| | | | |
|---|---|---|---|
| 6,766,466 B1 * | 7/2004 | Jibbe | 714/4 |
| 6,941,467 B2 * | 9/2005 | Judge et al. | 726/22 |
| 6,988,224 B2 * | 1/2006 | Robison et al. | 714/47 |
| 7,003,780 B2 | 2/2006 | Peloquin et al. | |
| 7,051,098 B2 * | 5/2006 | Masters et al. | 709/224 |
| 7,058,844 B2 * | 6/2006 | Wiley et al. | 714/4 |
| 7,072,894 B2 | 7/2006 | Loy et al. | |
| 7,076,688 B2 * | 7/2006 | Yamamoto | 714/6 |
| 7,089,428 B2 * | 8/2006 | Farley et al. | 726/22 |
| 7,089,590 B2 * | 8/2006 | Judge et al. | 726/22 |
| 7,096,248 B2 * | 8/2006 | Masters et al. | 709/201 |
| 7,096,498 B2 * | 8/2006 | Judge | 726/22 |
| 7,103,798 B2 * | 9/2006 | Morita | 714/6 |
| 7,124,438 B2 * | 10/2006 | Judge et al. | 726/22 |
| 7,131,032 B2 * | 10/2006 | Gibson et al. | 714/26 |
| 7,171,654 B2 * | 1/2007 | Werme et al. | 717/130 |
| 7,181,743 B2 * | 2/2007 | Werme et al. | 718/104 |
| 7,206,912 B2 * | 4/2007 | Mikami | 711/162 |
| 7,213,260 B2 * | 5/2007 | Judge | 726/3 |
| 7,225,466 B2 * | 5/2007 | Judge | 726/22 |
| 7,272,848 B1 * | 9/2007 | Meyer et al. | 726/1 |
| 7,315,976 B2 * | 1/2008 | Holt | 714/769 |
| 7,343,524 B2 * | 3/2008 | Klotz et al. | 714/39 |
| 7,343,624 B1 * | 3/2008 | Rihn et al. | 726/24 |
| 7,346,924 B2 * | 3/2008 | Miyawaki et al. | 726/6 |
| 7,376,132 B2 * | 5/2008 | Conway | 370/389 |
| 7,409,583 B2 * | 8/2008 | Yamamoto et al. | 714/6 |
| 7,412,626 B2 * | 8/2008 | Wood et al. | 714/38 |
| 7,418,733 B2 * | 8/2008 | Connary et al. | 726/25 |
| 7,434,109 B1 * | 10/2008 | Stabile et al. | 714/47 |
| 7,457,981 B2 * | 11/2008 | Morita | 714/7 |
| 7,464,407 B2 * | 12/2008 | Nakae et al. | 726/22 |
| 7,475,283 B2 * | 1/2009 | Morita | 714/7 |
| 7,574,740 B1 * | 8/2009 | Kennis | 726/22 |
| 7,661,136 B1 * | 2/2010 | Spielman | 726/22 |
| 2002/0032871 A1 * | 3/2002 | Malan et al. | 713/201 |
| 2002/0103663 A1 * | 8/2002 | Bankier et al. | 705/1 |
| 2002/0194524 A1 * | 12/2002 | Wiley et al. | 714/4 |
| 2003/0037136 A1 * | 2/2003 | Labovitz et al. | 709/224 |
| 2003/0061305 A1 * | 3/2003 | Copley et al. | 709/217 |
| 2003/0163727 A1 * | 8/2003 | Hammons et al. | 713/201 |
| 2003/0172302 A1 * | 9/2003 | Judge et al. | 713/201 |
| 2003/0188189 A1 * | 10/2003 | Desai et al. | 713/201 |
| 2003/0237017 A1 * | 12/2003 | Jibbe | 714/4 |
| 2004/0004941 A1 * | 1/2004 | Malan et al. | 370/254 |
| 2004/0044912 A1 * | 3/2004 | Connary et al. | 713/201 |
| 2004/0073677 A1 * | 4/2004 | Honma et al. | 709/226 |
| 2004/0088606 A1 * | 5/2004 | Robison et al. | 714/47 |
| 2004/0172557 A1 * | 9/2004 | Nakae et al. | 713/201 |
| 2004/0199579 A1 * | 10/2004 | Straw | 709/204 |
| 2004/0199680 A1 * | 10/2004 | Shah | 710/36 |
| 2004/0210654 A1 * | 10/2004 | Hrastar | 709/224 |
| 2004/0216131 A1 * | 10/2004 | Robison | 719/315 |
| 2005/0044406 A1 * | 2/2005 | Stute | 713/201 |
| 2005/0055350 A1 * | 3/2005 | Werme et al. | 707/10 |
| 2005/0060598 A1 * | 3/2005 | Klotz et al. | 714/4 |
| 2005/0193281 A1 * | 9/2005 | Ide et al. | 714/47 |
| 2005/0278789 A1 * | 12/2005 | Wright et al. | 726/26 |
| 2006/0017964 A1 * | 1/2006 | Maki | 358/1.15 |
| 2006/0036899 A1 * | 2/2006 | Nemoto et al. | 714/5 |
| 2006/0107089 A1 * | 5/2006 | Jansz et al. | 714/5 |
| 2006/0136995 A1 * | 6/2006 | Chen | 726/4 |
| 2006/0229022 A1 * | 10/2006 | Bu et al. | 455/69 |
| 2006/0236374 A1 * | 10/2006 | Hartman | 726/3 |
| 2006/0236395 A1 * | 10/2006 | Barker et al. | 726/23 |
| 2006/0272027 A1 * | 11/2006 | Noble | 726/27 |
| 2006/0277539 A1 * | 12/2006 | Amarasinghe et al. | 717/168 |
| 2007/0055789 A1 * | 3/2007 | Claise et al. | 709/234 |
| 2007/0073984 A1 * | 3/2007 | Barsness et al. | 711/154 |
| 2007/0107059 A1 * | 5/2007 | Chasin et al. | 726/23 |
| 2007/0147338 A1 * | 6/2007 | Chandra et al. | 370/350 |
| 2007/0195753 A1 * | 8/2007 | Judge et al. | 370/352 |
| 2008/0016564 A1 * | 1/2008 | Claudatos et al. | 726/22 |
| 2008/0072309 A1 * | 3/2008 | Kleinsteiber et al. | 726/14 |
| 2008/0126836 A1 * | 5/2008 | DiZoglio et al. | 714/4 |
| 2008/0172739 A1 * | 7/2008 | Nakae et al. | 726/22 |
| 2008/0263663 A1 * | 10/2008 | Ide et al. | 726/22 |
| 2009/0031176 A1 * | 1/2009 | Ide et al. | 714/47 |

OTHER PUBLICATIONS

EMC2, EMC SRDF Family, Powerful remote replication solutions improve organizational productivity, enhance online business continuity, Sep. 2004.

Matthew Fordahl, "Spyware, adware threat to be hot topic at security conference," Feb. 14, 2005, The Associated Press, http://www.securityfocus.com/print/news/10496.

Ellen Messmer, "Cisco launches IPS offensive," Feb. 14, 2005, Techworld, http://www.techworld.com/news/index.cfm?newsID=3131.

* cited by examiner

ANOMALY DETECTION FOR STORAGE TRAFFIC IN A DATA CENTER

BACKGROUND OF THE INVENTION

The present invention relates to storage area networks. More particularly, it relates to detection of anomalies of the traffic for such storage area networks.

In recent years, the capacity of storage devices has not increased as fast as the demand for storage. Additionally, a host may wish to use multiple storage devices because it needs tiered and heterogeneous storage or because storage management facilities are needed for reasons specific to the storage environment. For example, it may be desirable to use database tables on a fast storage device, and other tables on a slower or less expensive storage device.

In order to solve these storage limitations, the storage area network (SAN) was developed. Generally, a storage area network is a high-speed special-purpose network that interconnects different data storage devices and associated data hosts on behalf of a larger network of users.

Protection of network storage resources in a data center is of paramount importance. Today this has become mandatory not only because of the rise of network based attacks but also due to changes in various regulatory environments. For example, Sarbanes-Oxley and HIPPA (HEALTH INSURANCE PORTABILITY AND ACCOUNTABILITY ACT) regulations mandate that the data center provider must implement robust mechanisms to detect any anomalous behavior in the network.

In large server farms, grid computing and server virtualization have become state of the art. In these types of systems, multiple servers or hosts typically share the same data. It is extremely important to protect the critical storage resource from a single compromised host without impacting the entire server farm. For example, consider a scenario where all the servers in a grid have been authorized access to storage resource. In this scenario a single compromised server is able to corrupt the shared storage meta data and, thereby, cause the entire grid to fail. Current mechanisms in SAN security do not detect such anomalous behavior.

In the above setup the compromised server can also result in a Denial of Service (DOS) attack by causing excessive access to shared storage resource, thereby, degrading the availability of resources to other non-compromised hosts in the grid. Traditional SAN security techniques such as hard zoning, LUN zoning, read-only zoning, etc. cannot prevent or detect such anomaly. Note that the compromised host has been authorized access to the storage resource because it is a trusted host and this trusted host then proceeds to take malicious actions. For example, a compromised host may take the form of a malicious host, an infected host, or a host with an application software bug that can corrupt user data.

Another type of anomaly could arise due to changes in traffic that affect a storage network's configuration. In many cases, storage networks are configured for optimal performance based on usage pattern. For example, stripe unit size is configured based on predominant IO size (or size of each data write) of the traffic. Any deviation from this IO size could lead to significant performance degradation. Such deviation may happen due to a misconfiguration or change in the software application using the storage resource. Detection of such misconfiguration or change is extremely valuable in a datacenter.

Accordingly, it would be beneficial to provide anomaly detection for storage traffic. Additionally, mechanisms for managing detected anomalies so as to minimize deleterious effects caused by such anomalies would also be beneficial.

SUMMARY OF THE INVENTION

The present invention provides methods and apparatus for detecting anomalies in storage traffic in a storage area network (SAN). Provided are one or more anomaly type(s) and corresponding actions to be performed when the one or more anomaly types are detected. In general, mechanisms are provided for detecting various anomaly types of traffic within a SAN, such as SAN 100. Additionally, various actions are contemplated herein for handling detected anomalies.

In one embodiment, a method of detecting anomalies in a storage area network (SAN) is disclosed. Provided are one or more anomaly type(s) and corresponding actions to be performed when the one or more anomaly types are detected. Traffic in the SAN is then examined in order to detect the one or more provided anomaly type(s) in the examined traffic. When a one of the provided one or more anomaly type(s) is detected, one or more of the corresponding action(s) is performed.

In a specific implementation, the traffic of a particular storage network device in the SAN is examined. In a further aspect, the one or more anomaly type(s) and corresponding action(s) are provided to the particular storage network device by a user. In a specific embodiment, the provided anomaly type(s) includes a Read or Write access pattern anomaly. In a further aspect, the Read or Write access pattern anomaly is detected for a particular host and storage area device of the SAN, a particular one or more logical unit(s) (LUNs) of the particular storage device, and one or more specified logical block address (LBA) range(s) of the particular storage device.

In another implementation, the provided anomaly type(s) includes excessive login or control requests from a particular host in the SAN or excessive control plane requests that will adversely degrade performance of the particular storage network device. In yet another aspect, the provided anomaly type(s) includes anomalous bandwidth usage by a particular host in the SAN. The bandwidth usage may be examined on the basis of (i) data size per second and/or (ii) write or read (IO) operations per second.

In another implementation, the provided anomaly type(s) includes a configuration change in the SAN. The configuration change can be selected from one or more of the following: an I/O size change, a stripe unit size change, a change in the number of servers, a service policy change, a change in the number of ports of the storage network device, a software change, and a change in a Read or Write flow sequence. In another implementation example, the provided anomaly type (s) includes anomalous hardware behavior in the SAN.

In some aspects, the anomalous hardware behavior includes an error report anomaly or a drop rate anomaly. In a specific implementation, the one or more corresponding action(s) include logging and publishing the detected anomaly. In another aspect, the one or more corresponding action(s) include enabling span in the particular storage network device so that the detected anomaly is captured for off-line analysis by an analysis device. In yet another aspect, the one or more corresponding action(s) include re-authenticating a host that is responsible or has caused the detected anomaly. In a further feature, the one or more corresponding action(s) include disabling access for a host that is responsible or has caused the detected anomaly, and access is disabled via an access control list (ACL) for the particular storage network device. In another feature of the invention, the one or more corresponding action(s) include controlling the rate of the traffic on a link coupled to the particular storage network device on which the anomaly is detected. In one aspect, the one or more corresponding action(s) include shutting down a link coupled to the particular storage network device on which the anomaly is detected.

In another embodiment, the invention pertains to an apparatus for detecting anomalies in a storage area network. The apparatus includes one or more processors and one or more memory. At least one of the memory and processors are adapted to provide at least some of the above described method operations.

These and other features of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
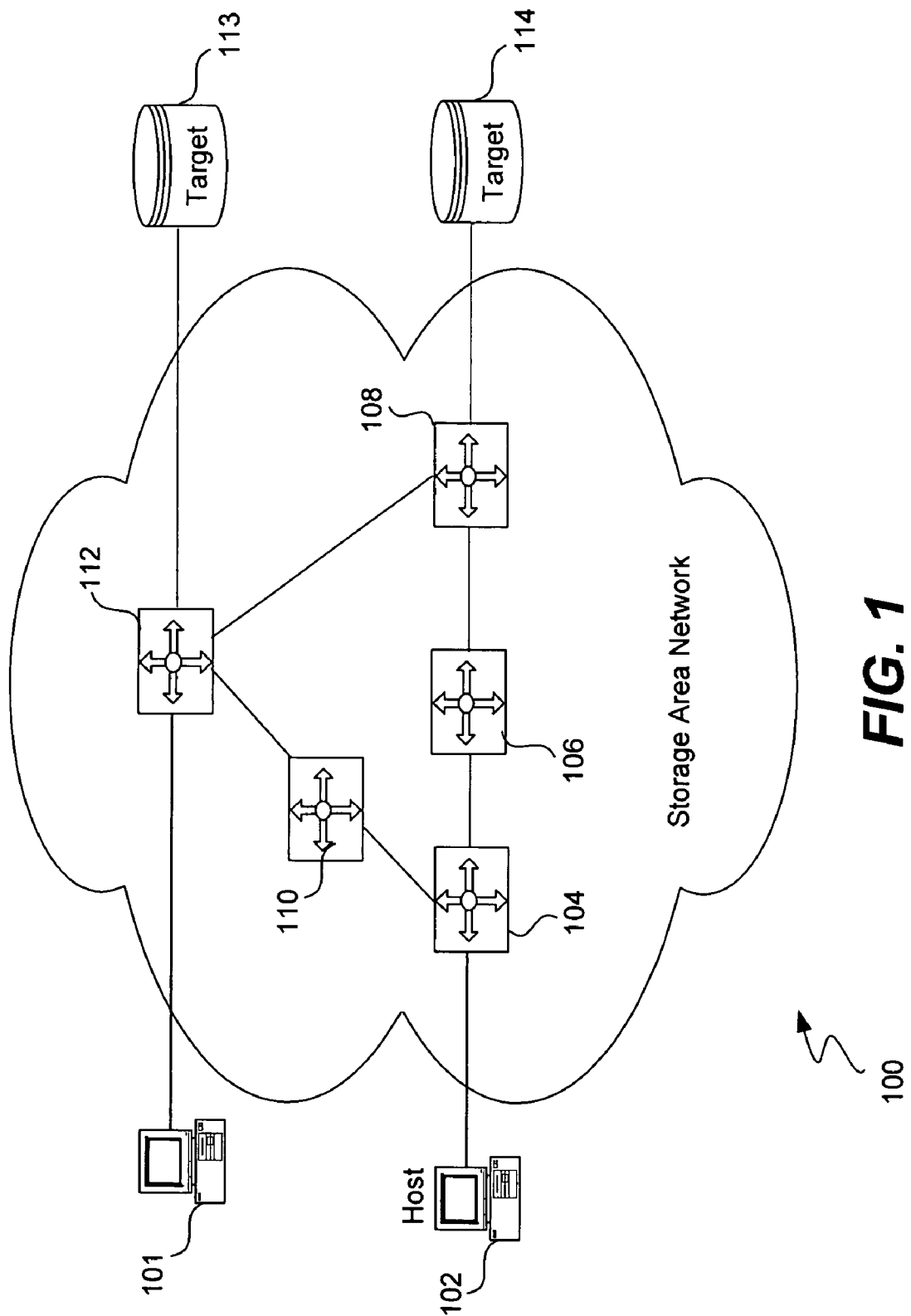
FIG. 1 is a block diagram illustrating an exemplary storage area network (SAN) in which various embodiments of the invention may be implemented.

FIG. 1 is a block diagram illustrating an exemplary storage area network (SAN) 100 in which various embodiments of the invention may be implemented. The configuration of FIG. 1 will also be used to illustrate the inventive mechanisms described below. The SAN 100 includes one or more storage devices and network devices or switches. As shown, the SAN 100 includes target 114, target 113, and switches 104, 106, 108, 110, and 112.

A host 102 may access a target or storage device 114 of SAN 100 through one or more switch(es). Host 102 may access target 114 through one or more paths that include the host's switch 104 and the target's switch 108. For example, host 102 may access target 114 through switches 104, 106, and 108. Likewise, host 101 may access target 113 through switch 112. Of course, FIG. 1 represents merely one example of a SAN fabric in which techniques of the present invention may be practiced. For example, the fabric may have any number of Virtual SANs (VSANS) that include any number and type of host and storage devices or virtual devices, and each VSAN may be coupled to one or more other VSANs.

In Fibre Channel (FC), each device (hosts, storage devices and switches) is identified by a globally unique, eight (8) byte wide World Wide Name (WWN) assigned by the manufacturer. When the Fibre Channel devices are interconnected to form a SAN or VSAN, the WWN (along with other parameters) is the primary mechanism to uniquely identify each device. Fibre Channel frames are used for communication among the devices in the SAN. The WWN, however, is not used by the frames. Each device must login to the FC network and is then dynamically assigned a unique Fibre Channel address (FCID) by the Fabric. The FCID is used in FC networks for end devices to communicate with each other. Each switch and port of each switch will also have an associated WWN and FCID.

In some of the discussion herein, embodiments of this invention are described in terms of the SCSI protocol. This is because many storage area networks in commerce run a SCSI protocol to access storage sites. Frequently, the storage area network employs fibre channel (e.g., FC-PH (ANSI X3.230-1994, Fibre channel—Physical and Signaling Interface)) as a lower level protocol and runs IP and SCSI on top of fibre channel. Note that the invention is not limited to any of these protocols. For example, fibre channel may be replaced with Ethernet, Infiniband, and the like. Further the higher level protocols need not include SCSI. For example, this may include SCSI over FC, iSCSI (SCSI over IP), parallel SCSI (SCSI over a parallel cable), serial SCSI (SCSI over serial cable, and all the other incarnations of SCSI.

Because SCSI is so widely used in storage area networks, much of the terminology used herein will be SCSI terminology. The use of SCSI terminology (e.g., "initiator" and "target") does not imply that the describe procedure or apparatus must employ SCSI. Before going further, it is worth explaining a few of the SCSI terms that will be used in this discussion. First an "initiator" is a device (usually a host system) that requests an operation to be performed by another device. Typically, in the context of this document, a host initiator will request a read or write operation be performed on a region of virtual or physical memory. Next, a "target" is a device that performs an operation requested by an initiator. For example, a target physical memory disk will obtain or write data as initially requested by a host initiator.

Targets may be divided into physical or virtual "logical units." These are specific devices addressable through the target. For example, a physical storage subsystem may be organized in a number of distinct logical units. In this document, hosts view virtual memory as distinct virtual logical units. Sometimes herein, logical units will be referred to as "LUNs." In the SCSI standard, LUN refers to a logical unit number. But in common parlance, LUN also refers to the logical unit itself.

Figure 2:
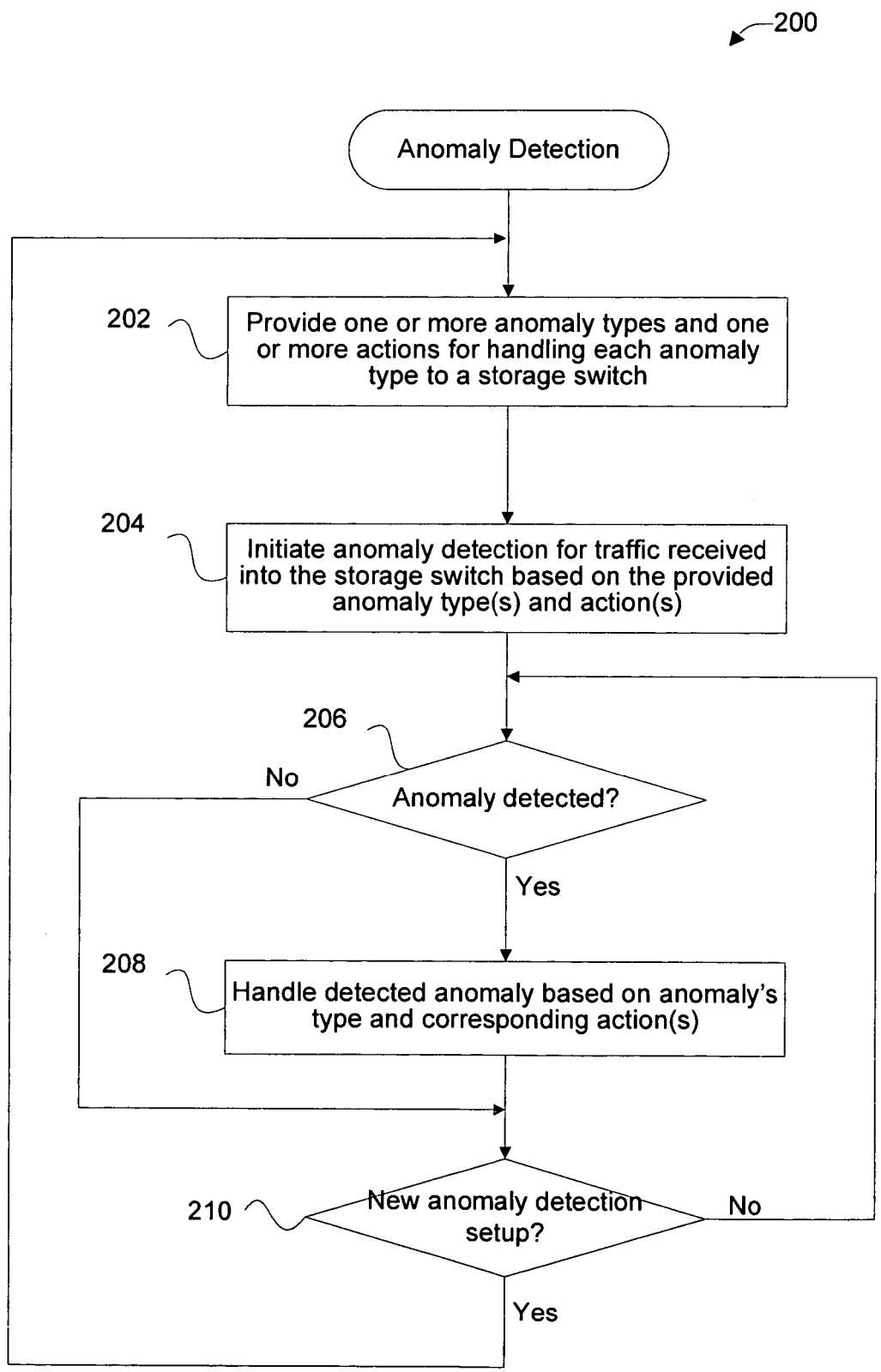
FIG. 2 is a flowchart illustrating a high level procedure for anomaly detection in a particular storage switch in accordance with one embodiment of the present invention.

In general, the present invention provides various mechanisms for detecting various anomaly types of traffic within a SAN, such as SAN 100. Additionally, various actions are contemplated herein for handling detected anomalies. FIG. 2 is a flowchart illustrating a high level procedure 200 for anomaly detection in a particular storage switch in accordance with one embodiment of the present invention. Although embodiments of the present invention are described as being implemented with respect to a switch, of course, other types of network devices may be utilized. Additionally, this procedure 200 may be applied to any number and type of network devices within a storage area network.

Initially, one or more anomaly types and one or more actions are provided for handling each anomaly type to a storage switch in operation 202. For instance, several different types of anomalies may be detectable in a particular storage switch and a specific set of one or more anomaly type(s) may be selected for detection in such storage switch, for example, by a user or administrator. Anomaly triggers and corresponding actions for handling anomalies may be selected by a user or preconfigured in the anomaly detection software or hardware. Various anomaly detection types and triggers for detecting such anomalies are further described below. Different actions for handling traffic anomalies of a particular switch may also be selectable. For instance, certain anomaly types may be simply examined, while other anomalies require that a anomaly causing host's access to the network be restricted. Various actions for handling anomalies are outlined below.

After one or more anomaly types and actions are provided, anomaly detection or monitoring is then initiated for traffic received into the storage switch based on the provided anomaly types and actions in operation 204. It is then determined whether a anomaly has been detected in operation 206. That is, it is determined whether one of the selected or provided anomaly type has been detected in the traffic of the storage switch. If an anomaly has been detected, the detected anomaly is handled based on the anomaly's type and one or more actions that were provided for the particular anomaly type in operation 208. If no anomaly has been detected, this operation 208 is skipped.

It is then determined whether a new anomaly detection setup is being provided in operation 210. If no new anomaly detection setup is occurring, the procedure 200 jumps to operation 206 and awaits detection of another anomaly. If there is a new anomaly detection setup, the entire procedure 200 repeats so that new anomaly types and corresponding actions for handling such anomaly types may be provided.

The present invention may include detection of any suitable type of anomaly. FIGS. 3 through 6 illustrate a subset of the possible anomaly types that could be detected with techniques of the present invention. Such examples are merely illustrative and not meant to limit the scope of the invention.

Figure 3:
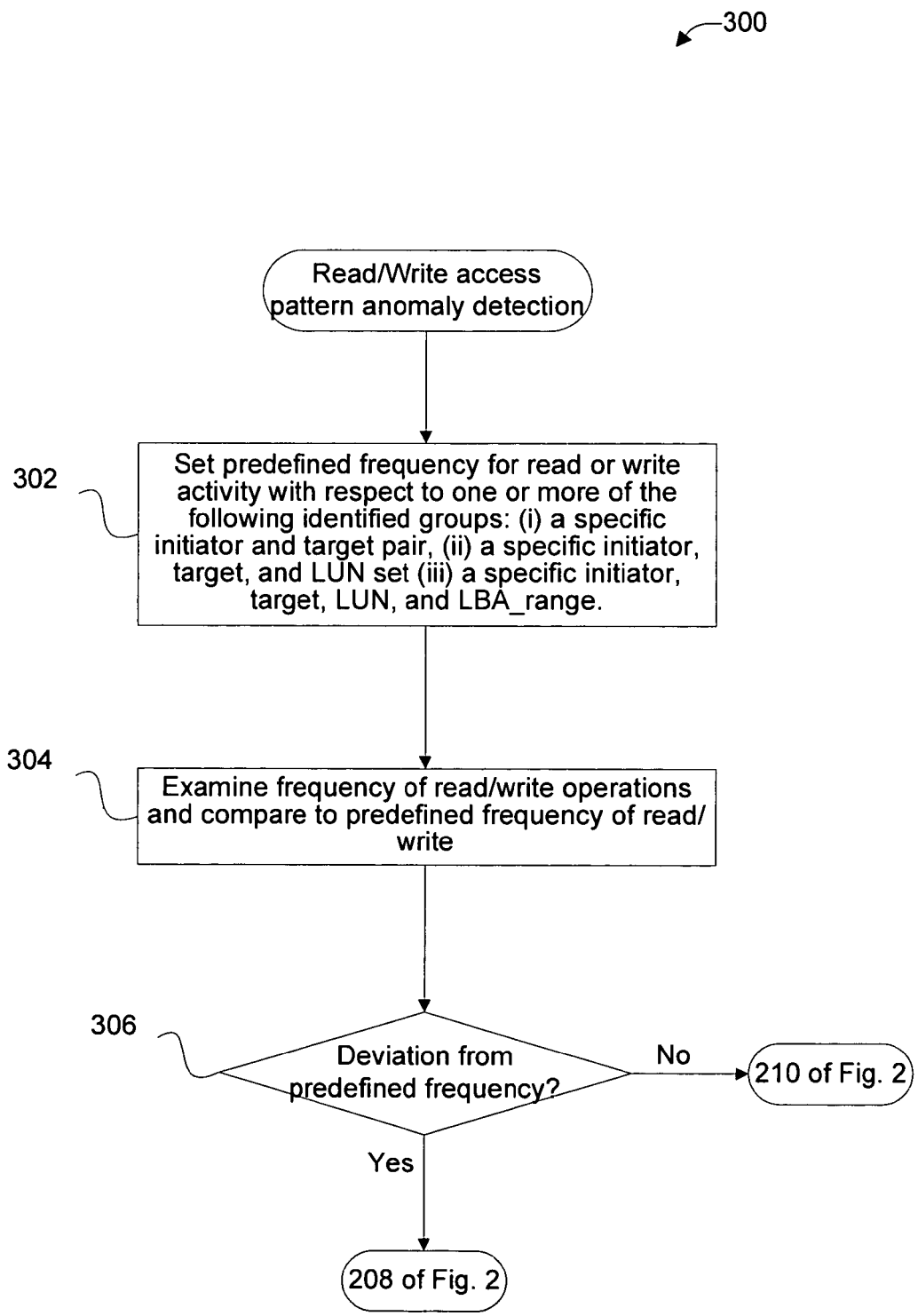
FIG. 3 is a flowchart illustrating a procedure for Read/Write Access Pattern anomaly detection in accordance with one implementation of the present invention.

FIG. 3 is a flowchart illustrating a procedure 300 for a Read/Write Access Pattern anomaly detection in accordance with one implementation of the present invention. Initially, a predefined frequency may be set for read or write activity with respect with one or more of the following identified groups: (i) a specific initiator and target pair, (ii) a specific initiator, target, and LUN set, and/or (iii) a specific initiator, target, LUN and logical block address (LBA)_range in operation 302.

The predefined frequency may take any suitable form. For example, for a particular initiator and target pair (and possible specific LUN and/or LBA_Range), a write operation may be defined as "never occurring" or "occurring very infrequently", defined as less than a predefined rate, defined as occurring less than a predefined number of times, etc. In the later examples a frequency or number threshold may be set for Read/Write operations. Particular sensitive data may be stored within specific LBA_ranges and access to such areas of the target may be restricted. For example, virtualization meta data, such as virtual LUN to physical LUN mapping, is typically stored in a particular LBA_Range. Access to this meta data may be only infrequently allowed. In another example, encryption keys may be stored in a particular LBA_Range.

The frequency of the read/write operations is then examined and compared to the predefined frequency of read/write in operation 304. It is then determined whether a deviation from the predefined frequency has occurred in operation 306. For example, if a write operation by a particular initiator to a particular target is defined as very infrequent, the frequency of write operations by the particular initiator to the particular target are examined. If a deviation has occurred, the procedure 300 jumps to operation 208 of FIG. 2 where the detected anomaly is handled. Handling actions are described further below. If there is no deviation, the procedure 300 jumps to operation 210 of FIG. 2 where is it determined whether another anomaly detection setup has occurred.

A deviation may be defined in any suitable manner. For instance, if a write operation from a particular initiator to a particular target (and possibly LUN and LBA_range) is defined as being very infrequent, any Write operation may be considered as a deviation. Alternatively, a rate of Write operations that is higher than a predefined frequency may be defined as a deviation. In yet another example, when the number of Write operations by a particular initiator to a particular target exceeds a predefined number, this may be considered to be a deviation. The same type of deviations may be considered for a read operation performed by a particular initiator with respect to a particular target (and possibly LUN and LBA_range). Alternatively, a frequency or number for Read/Write operations is not predefined, and the Read and Write operations are examined to determine an average. When either Read or Write operations deviate significantly (e.g., by more than three standard deviations) from the average, it is determined that a deviation has occurred.

Figure 4:
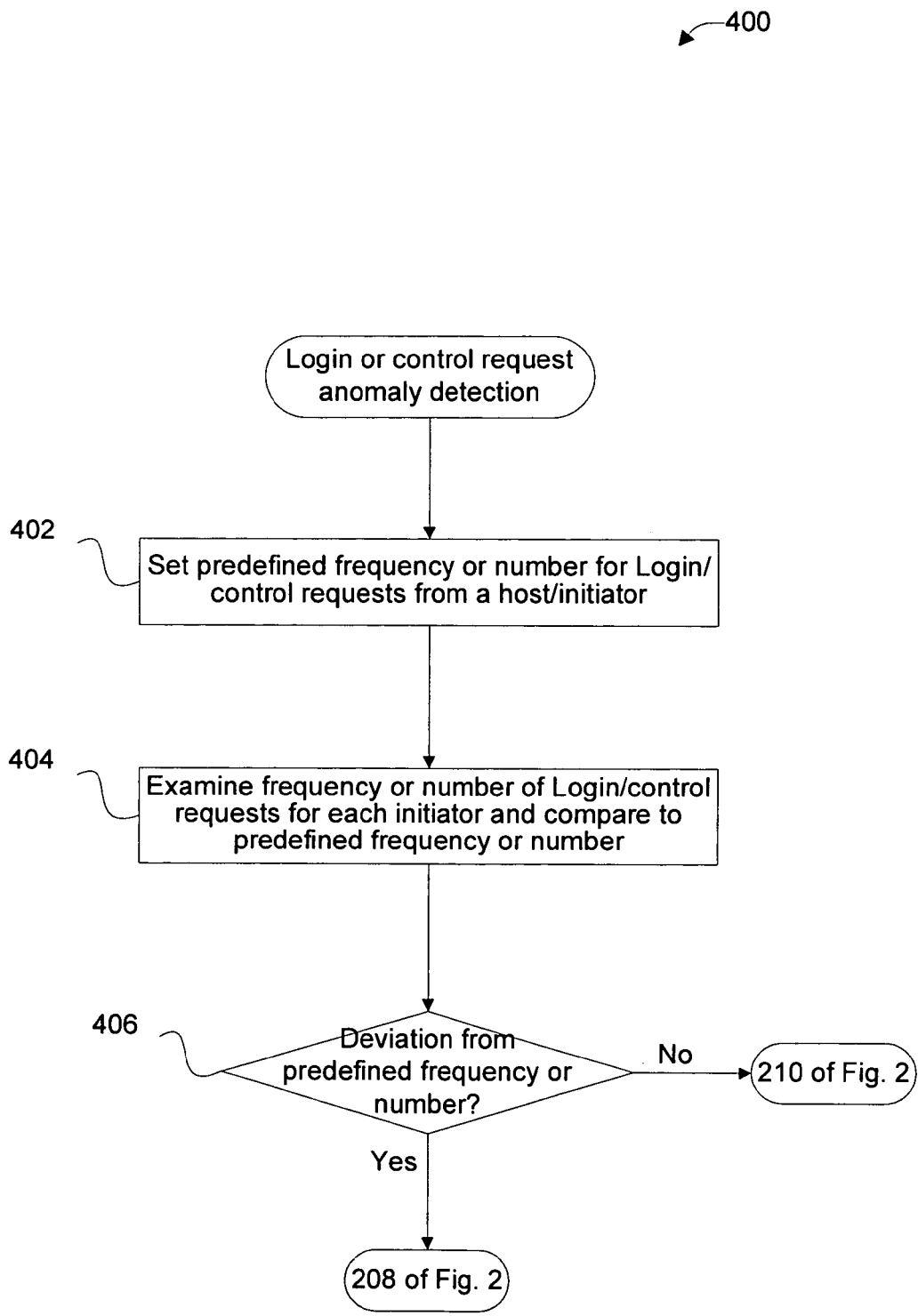
FIG. 4 is a flowchart illustrating a procedure for Login or control request anomaly detection in accordance with one embodiment of the present invention.

FIG. 4 is a flowchart illustrating a procedure 400 for a Login or control request anomaly detection in accordance with one embodiment of the present invention. Any suitable type of control or login requests may be examined. By way of examples, the following login or control requests may be examined at a particular switch: PLOGI (port log in), PRLI (process report log in), Report LUN, Inquiry, Test Unit Ready, and Read Capacity. When a particular hosts initiates a high number of login or control requests, the host may be, in effect, launching a denial of service attack. Thus, detections of anomalies in login or control requests by a particular host and handling such anomalies (e.g., stopping these requests when they exceed a particular threshold) would be beneficial to deter denial of service attacks. Additionally, a high number of login or control requests tends to utilize a rather high percentage of bandwidth, as compared to data traffic bandwidth, in the switch network.

Initially, a predefined frequency or number for a Login/control requests from a particular initiator is set in operation 402. The frequency (or alternatively a number) may be predefined for any type of control traffic or may be specifically predefined for a specific set of control traffic. For instance, a predefined frequency may be set for a PLOGI control request.

The frequency or number of login or control request from each initiator is examined and then compared to the predefined frequency or number in operation 404. A different frequency or number of control or login requests may be predefined for each particular host or initiator. However, a predefined frequency or number may be set for all hosts. That is, the frequency is examined for each host and compared to the single predefined frequency (or number). If there is no deviation, the procedure 300 jumps to operation 210 of FIG. 2 where is it determined whether another anomaly detection setup has occurred. It is then determined whether a deviation from the predefined frequency or number has occurred in operation 406. If there is no deviation, the procedure 400 goes to operation 210 of FIG. 2. Otherwise, the procedure 400 goes to operation 208 of FIG. 2. The different techniques for determining whether there is a Read/Write access pattern deviation that are described above with respect to FIG. 3 may be applied to determine whether there is a deviation in login and control requests.

Figure 5:
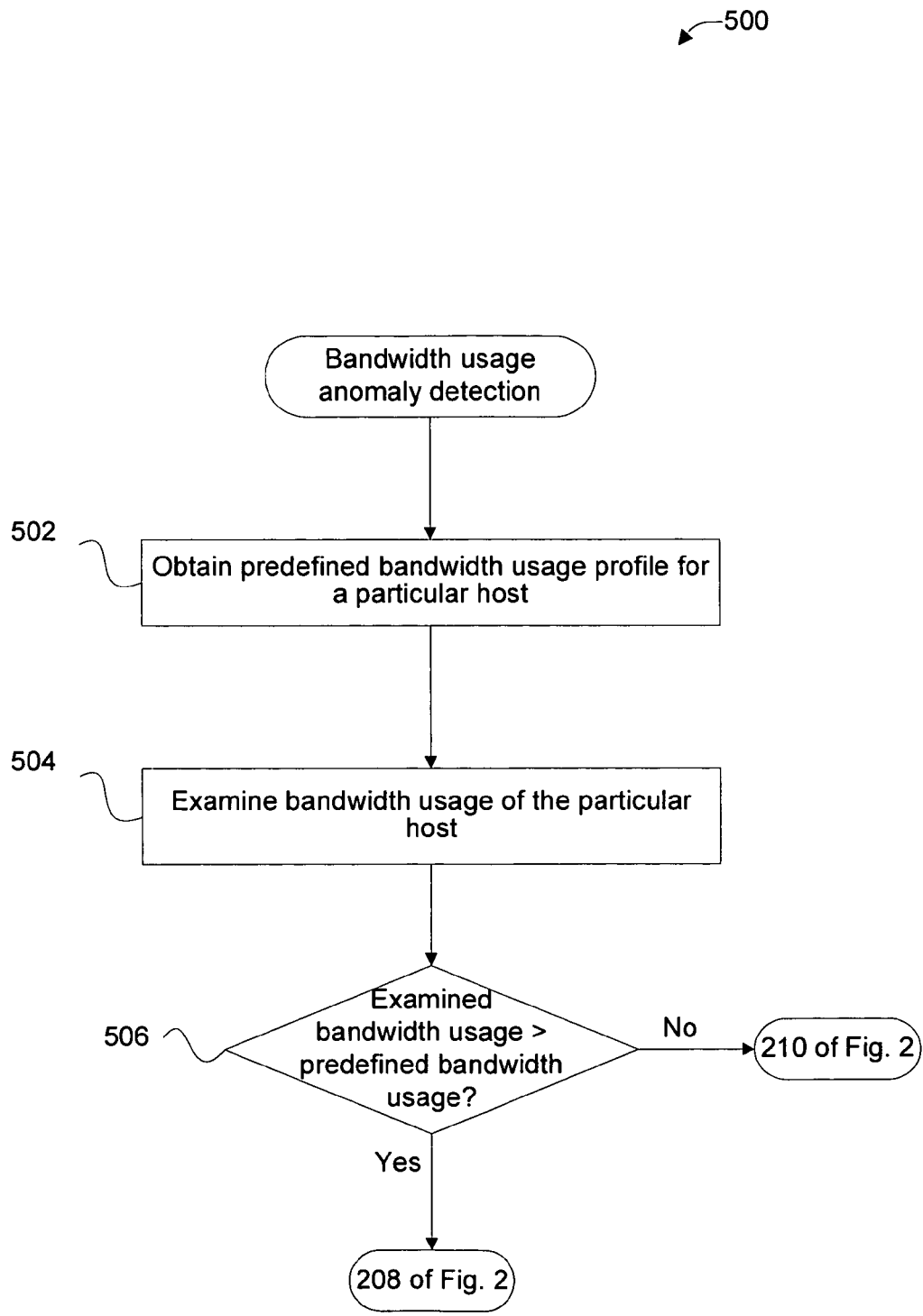
FIG. 5 is a flowchart illustrating a procedure for bandwidth usage anomaly detection in accordance with one implementation of the present invention.

FIG. 5 is a flowchart illustrating a procedure 500 for bandwidth usage anomaly detection in accordance with one implementation of the present invention. Initially, a predefined bandwidth usage profile is obtained for a particular host in operation 502. This usage profile may be predefined, for example, as described above for Read/Write frequency or a usage profile may be determined over time by monitoring the traffic of a particular host. The profile may include any suitable usage indicator, such as average, mean, as well as standard deviation values for frequency rate (e.g., Mbps) or I/O rates (e.g., number of Read/Writes per second). In general, when usage exceeds a particular predefined threshold, corrective action may be taken, such as rate limiting. A different profile may be obtained for each host that accesses a particular switch. Alternatively, the usage profile may also be obtained or predefined for a plurality of hosts, as opposed to being obtained for a particular host.

After a usage profile is predefined or determined based on the actual traffic of a particular host, the bandwidth usage for the particular host is then examined in operation 504. It is then determined whether the examined bandwidth usage is greater than the predefined bandwidth usage in operation 506. Alternatively, it may be determined whether the usage has significantly deviated from the average or predefined usage. Also, the different techniques for determining whether there is a Read/Write access pattern deviation that are described above with respect to FIG. 3 may be applied to determined whether there is a deviation in bandwidth usage. If the examined bandwidth usage does not exceed (or significantly deviate from) the predefined bandwidth usage, the procedure 500 jumps to operation 210 of FIG. 2. Otherwise, the procedure 500 jumps to operation 208 of FIG. 2, where the anomaly is handled.

Figure 6:
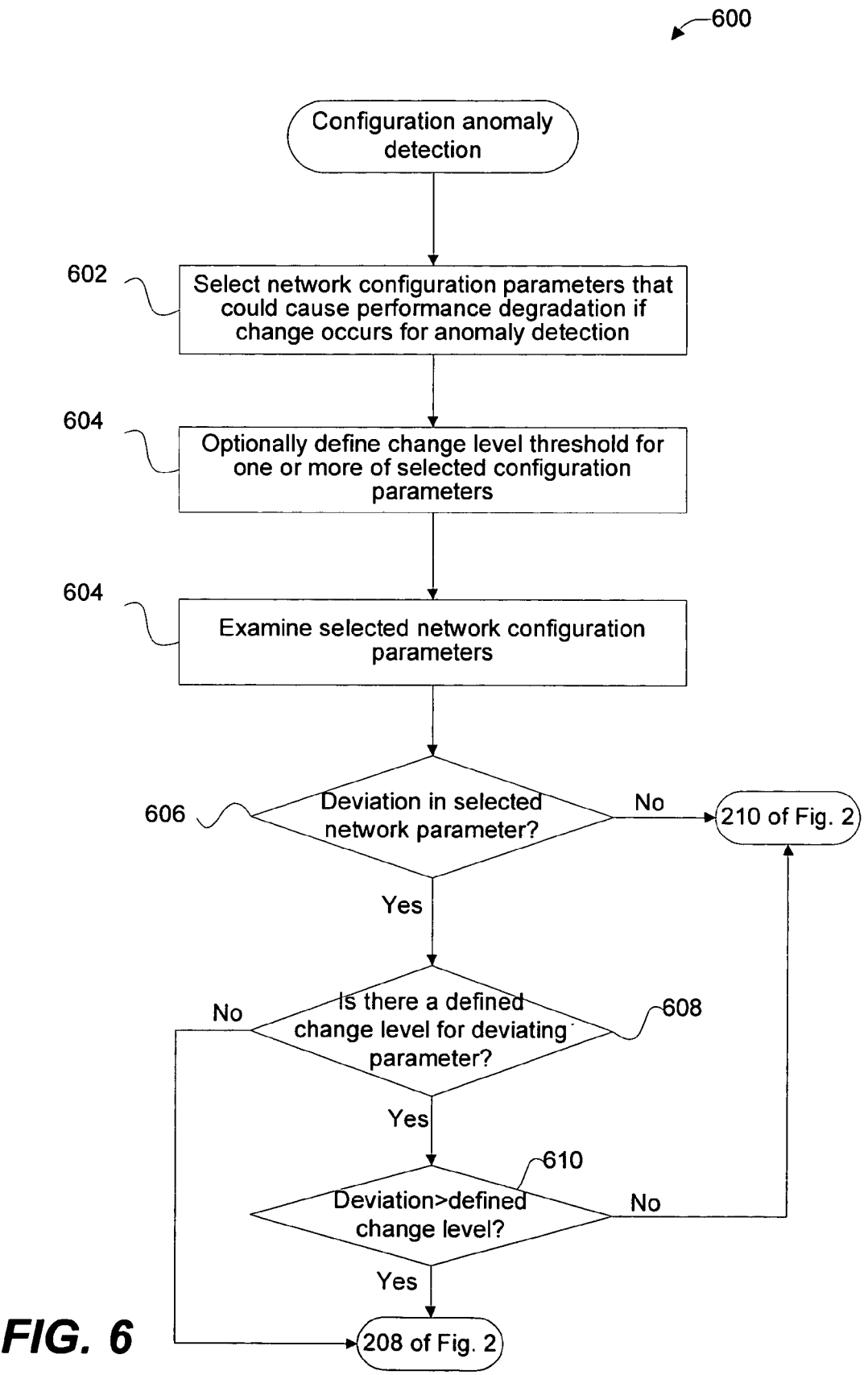
FIG. 6 is a flowchart illustrating a procedure for configuration anomaly detection in accordance with one aspect of the present invention.

FIG. 6 is a flowchart illustrating a procedure 600 for configuration anomaly detection in accordance with one aspect of the present invention. Initially, network configuration parameters that could cause performance degradation if a change occurs may be selected or provided for anomaly detection in operation 602. A change level threshold may be optionally defined for one or more of the selected configuration parameters in operation 604. The change level threshold may be in the form of an absolute threshold level or a percentage change threshold for a corresponding one or more of the selected configuration parameters. In the present invention, specific configuration parameters are selected for monitoring.

Any suitable type of configuration parameters, where a change in such parameters may cause a performance degradation, may be selected for anomaly detection. For instance, one or more of the following parameters may be selected for anomaly detection: I/O size, stripe unit size, number of servers that are added to or removed from the network, service policy changes, number of ports added to or removed from the network, software changes, changes in Read and Write flow sequence, etc.

A configuration change may lead to significant system performance degradation. Detection of such "mis-configuration" or configuration change can be extremely valuable in a data center. For example, a system's stripe unit size may configured for optimal performance based on a predominant IO size. If the predominant IO size than becomes larger than the configured stripe unit size, then the performance will degrade significantly. Thus, in one implementation, an IO size profile may be maintained for each host and target pair. If the predominant IO size deviates from the profile, then it can be reported, for example, to an administrator who may then take corrective action. In another scenario, a change in software could result in non-sequential IOs to a target. Sequential IOs to a target disk tend to result in much better performance than non-sequential IOs. A sequential 10 profile may be defined and deviation from such profile may be flagged as an anomaly and handled.

The selected network configuration parameters are then examined in operation 604. It is then determined whether a deviation has occurred in the selected network parameters in operation 606. The above described deviation techniques may be utilized. In implementation, any change of a selected configuration parameter is characterized as a deviation. In another embodiment, a predefined percentage change may be characterized as a deviation. If no deviation occurs, the procedure 600 jumps to operation 210 of FIG. 2 where it is determined whether a new anomaly detection setup has occurred.

If there is a deviation in a selected network parameter, it is then determined whether there is a defined change level for the deviating parameter in operation 608. If there is no defined change level, the procedure 600 jumps to operation 208 of FIG. 2 where the deviation is handled. If there is a predefined change level for the deviating parameter, it is then determined whether the deviation is greater than the predefined change level in operation 610. For example, it is determined whether the deviating parameter has changed by more than the predefined change level, e.g., percentage or absolute change threshold. In some cases, it may be determined whether the configuration parameter has exceeded or fallen below a predefined value. If the deviation does not exceed the defined change level, the procedure 600 jumps to operation 210 of FIG. 2. Otherwise, the procedure 600 jumps to operation 208 of FIG. 2 and the deviation is handled.

Another anomaly detection trigger may take the form of an anomalous hardware behavior, such as hardware failure. For example, a subset of hardware functionality may fail and be detectable. In one implementation a single port may be dropping a small number of I/Os at regular intervals. Dropped I/O that exceed a predefined rate may be flagged as an anomalous hardware behavior. Alternatively, all dropped I/O may be flagged as anomalous behavior. In another example, a disk may be reporting errors to a switch and these errors are defined as anomalies. Alternatively, after a predefined number of error reports are received at a particular switch, the error reports are defined as an anomaly.

When an anomaly is detected, it may be handled in any suitable manner. For example, an anomaly may simply be logged. The logged anomalies may also be published to any suitable entity, such as an administrator. Publication of the logged anomalies may take any suitable form, such as email, page, instant message, etc. Anomalies may also be handled by enabling the SPAN (switched port analyzer) utility (available in switches, such as the Catalyst 2940, available from Cisco Systems, Inc. of San Jose, Calif.) to capture the anomalous behavior for offline analysis. For example, traffic from the specific port on which the anomaly is detected may be mirrored to another port that is coupled to an external anomaly analysis device. That is, the traffic can be SPAN'd to an anomaly detection appliance for further analysis. The appliance can download appropriate policy to the system if needed to control or contain the anomaly. The appliance can use the existing anomaly detection hardware, with some changes to firmware only. Note that this is possible because SPAN implementations can use IP as a transport mechanism.

In another anomaly handling example, a host that is causing the anomaly may be re-authenticated. In another example, access of a comprised server may be denied by reconfiguring an ACL (access control list) for the particular server's WWN and FCID. Rate control may also be implemented for an anomalous link. For instance, credits may be reduced for a host. A link may also be shut down.

Figure 7:
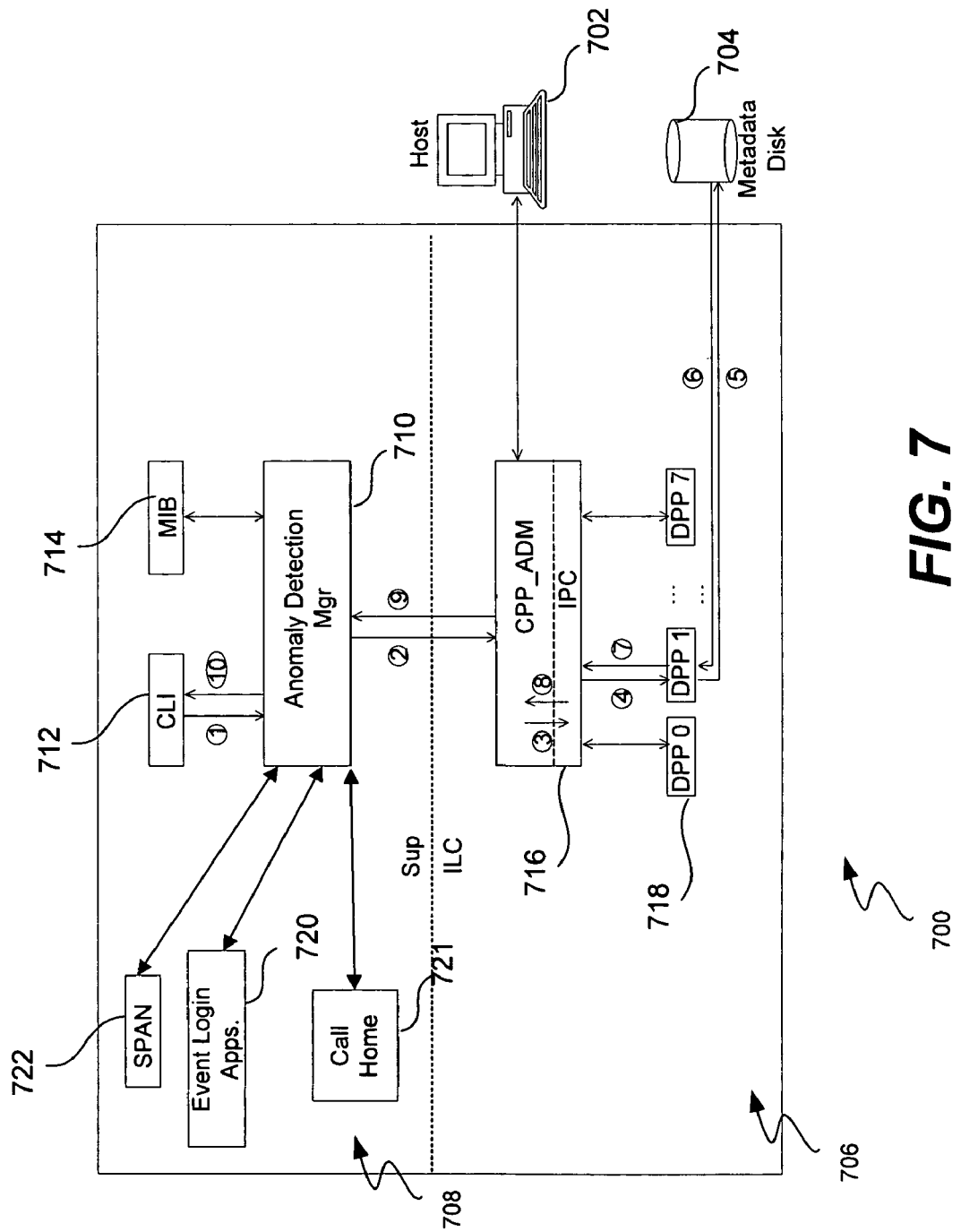
FIG. 7 is a logical block diagram of a switch implementing an anomaly detection manager in accordance with one embodiment of the present invention.

FIG. 7 is a logical block diagram of a switch 700 implementing an anomaly detection manager in accordance with one example of the present invention. A host 702 may use such anomaly detection switch 700 to communicate with a meta disk or storage device 704. As shown, the switch 700 includes a supervisor portion 708 and an intelligent linecard (ILC) portion 706. The intelligent linecard portion 706 may include any number and type of linecards.

As shown, the supervisor portion 708 includes an anomaly detection manager 710 for implementing techniques of the present invention. A user may configure anomaly types and actions for anomaly detection in the anomaly detection manager 710 via a command interface (e.g., CLI or command language interface 712) and/or a managed database of managed objects (e.g., MIB 714). The anomaly detection manager 710 then sends a message to a control path processor administrator CPP_ADM 716 of the intelligent linecard 706. The CPP_ADM 716 then programs its individual data path processors or DPPs 718 with the anomaly detection information. If the DPP detects an anomalous behavior, it then sends a message to the CPP_ADM 716. For example, the detected anomaly may be forward to the CPP_ADM 716.

The CPP_ADM 716 then generates events to the anomaly detection manager 710. The anomaly detection manager 710 may then handle the anomaly, which may include generating events to a higher level management application, such as Span 722, Event Manager 720, or Call Home 721. The higher-level management application can then take one of several corrective actions as described above.

The techniques of the present invention may be implemented in any suitable combination of hardware and software. For example, they can be implemented in an operating system kernel, in a separate user process, in a library package bound into network applications, on a specially constructed machine, or on a network interface card. In a specific implementation, they are implemented on a fabric switch of a storage area network.

In one implementation, the switch includes at least one memory device and at least one processor. The memory and processor are operable to perform any of the above described techniques, as well as standard switching/routing operations, virtualization management, zone management, etc.

Figure 8:
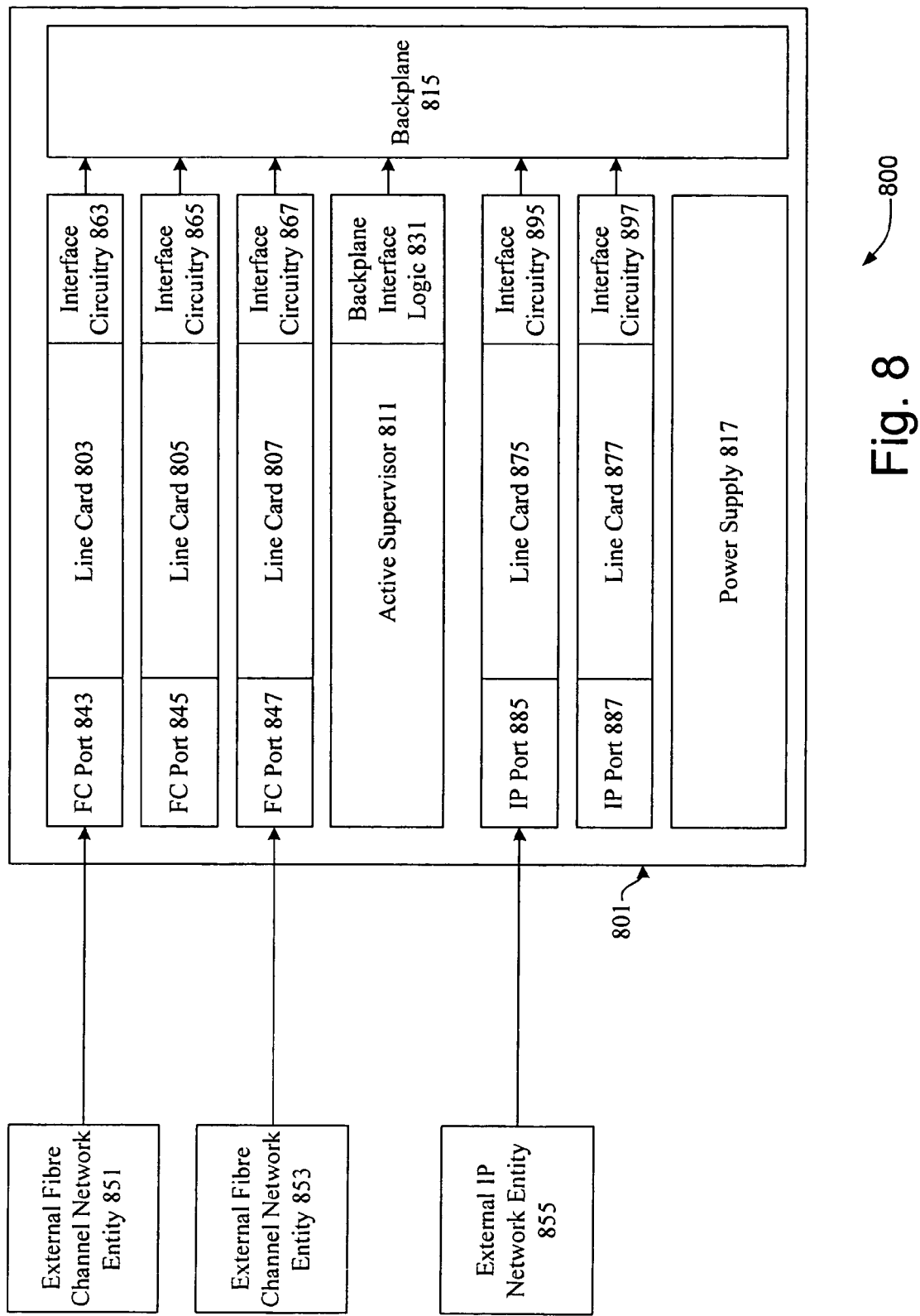
FIG. 8 is a diagrammatic representation of one example of a fibre channel switch that can be used to implement techniques of the present invention.

FIG. 8 is a diagrammatic representation of one example of a fibre channel switch that can be used to implement techniques of the present invention. Although one particular configuration will be described, it should be noted that a wide variety of switch and router configurations are available. The switch 801 may include one or more supervisors 811 and power supply 817. According to various embodiments, the supervisor 811 has its own processor, memory, and storage resources.

Line cards 803, 805, and 807 can communicate with an active supervisor 811 through interface circuitry 863, 865, and 867 and the backplane 815. According to various embodiments, each line card includes a plurality of ports that can act as either input ports or output ports for communication with external fibre channel network entities 851 and 853. The backplane 815 can provide a communications channel for all traffic between line cards and supervisors. Individual line cards 803 and 807 can also be coupled to external fibre channel network entities 851 and 853 through fibre channel ports 843 and 847.

External fibre channel network entities 851 and 853 can be nodes such as other fibre channel switches, disks, RAIDS, tape libraries, or servers. The fibre channel switch can also include line cards 875 and 877 with IP ports 885 and 887. In one example, IP port 885 is coupled to an external IP network entity 855. The line cards 875 and 877 also have interfaces 895 and 897 to the backplane 815.

It should be noted that the switch can support any number of line cards and supervisors. In the embodiment shown, only a single supervisor is connected to the backplane 815 and the single supervisor communicates with many different line cards. The active supervisor 811 may be configured or designed to run a plurality of applications such as routing, domain manager, system manager, and utility applications. The supervisor may include one or more processors coupled to interfaces for communicating with other entities.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

Regardless of fabric switch's configuration, it may employ one or more memories or memory modules configured to store data, database(s), and program instructions for the general-purpose network operations and/or the inventive techniques described herein. The program instructions may control the operation of an operating system and/or one or more applications, for example. The memory or memories may also be configured to store ACL Redirect tables and information, topology maps, routing information, service lists, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method of detecting anomalies in a storage area network (SAN) comprising at least a network device, a plurality of servers, and a plurality of storage devices accessible by the plurality of servers, the method comprising:
   at the network device, providing an anomaly type and corresponding action to be performed when the anomaly type is detected for traffic received by the network device of the SAN and such received traffic pertains to a particular server of the SAN requesting that data be read to a particular storage device of the SAN or written to the particular storage device of the SAN, wherein the particular server of the SAN is logged into the particular storage device of the SAN;
   at the network device, monitoring traffic that is received by the network device sent from the particular server to the particular storage device so as to detect the provided anomaly type in the monitored traffic; and
   when the provided anomaly type is detected, performing the corresponding action.

2. A method as recited in claim 1, wherein the provided anomaly type pertains to only the traffic sent between the particular server and the particular storage device in the SAN.

3. A method as recited in claim 2, wherein the anomaly type is a Read or Write pattern anomaly for traffic sent between the particular server and the particular storage device in the SAN.

4. A method as recited in claim 3, wherein the Read or Write pattern anomaly indicates that a frequency of Read and/or Write activity has exceeded a predefined threshold for the particular server and the particular storage device in the SAN.

5. A method as recited in claim 4, wherein the Read or Write access pattern anomaly indicates that the frequency of Read and/or Write activity has exceeded the predefined threshold for the particular server and a particular one or more logical unit(s) (LUNs) of the particular storage device.

6. A method as recited in claim 5, wherein the Read or Write access pattern anomaly indicates that the frequency of Read and/or Write activity has exceeded the predefined threshold for the particular server and one or more specified logical block address (LBA) range(s) of the particular storage device.

7. A method as recited in claim 1, wherein the provided anomaly type is traffic pertaining to excessive login or control requests from the particular server in the SAN that have a frequency that exceeds a predefined threshold.

8. A method as recited in claim 1, wherein the provided anomaly type is traffic that has an anomalous bandwidth usage by the particular server in the SAN that has exceeded a predefined threshold.

9. A method as recited in claim 8, wherein the anomalous bandwidth usage corresponds to (i) data size per second and/or (ii) write or read (IO) operations per second.

10. A method as recited in claim 2, wherein the provided anomaly type is a specified configuration change in the SAN that exceeds a predefined deviation level.

11. A method as recited in claim 10, wherein the configuration change is selected from a group consisting of an I/O size change, a stripe unit size change, a change in the number of servers, a service policy change, a change in the number of ports of the storage device, a software change, and a change in a Read or Write flow sequence.

12. A method as recited in claim 1, wherein the provided anomaly type is anomalous hardware behavior in the SAN.

13. A method as recited in claim 12, wherein the anomalous hardware behavior includes an error report anomaly or a drop rate anomaly.

14. A method as recited in claim 1, wherein the corresponding action includes logging and publishing the detected anomaly.

15. A method as recited in claim 1, wherein the corresponding action includes enabling SPAN (switched port analyzer) in the particular storage device so that the detected anomaly is captured for off-line analysis by an analysis device.

16. A method as recited in claim 1, wherein the corresponding action includes re-authenticating the particular server and the particular server is responsible or has caused the detected anomaly.

17. A method as recited in claim 1, wherein the corresponding action includes disabling access for the particular server and such particular server is responsible or has caused the detected anomaly, wherein access by the particular server is disabled via an access control list (ACL) for the particular storage device.

18. A method as recited in claim 1, wherein the corresponding action includes controlling the rate of the traffic on a link coupled to the particular storage device on which the anomaly is detected.

19. A method as recited in claim 1, wherein the corresponding action includes shutting down a link coupled to the particular storage device on which the anomaly is detected.

20. An apparatus for detecting anomalies in a storage area network (SAN) comprising the apparatus, a plurality of servers, and a plurality of storage devices accessible by the plurality of servers, the apparatus comprising:
   one or more processors;
   one or more memory, wherein at least one of the processors and memory are adapted for:
   at the apparatus, providing an anomaly type and corresponding action to be performed when the anomaly type is detected for traffic received by the apparatus of the SAN and such received traffic pertains to a particular server of the SAN requesting that data be read to a particular storage device of the SAN or written to the particular storage device of the SAN, wherein the particular server of the SAN is logged into the particular storage device of the SAN;
   at the apparatus, monitoring traffic that is received by the network device sent from the particular server to the particular storage device so as to detect the provided anomaly type in the monitored traffic; and
   when the provided anomaly type is detected, performing the corresponding action.

21. An apparatus as recited in claim 20, wherein the anomaly type and corresponding action are provided to the apparatus by a user.

22. An apparatus as recited in claim 20, wherein the anomaly type is a Read or Write pattern anomaly for traffic sent between the particular server and the particular storage device in the SAN and wherein the Read or Write pattern anomaly indicates that a frequency of Read and/or Write activity has exceeded a predefined threshold for the particular server and the particular storage device in the SAN.

23. An apparatus as recited in claim 22, wherein the Read or Write access pattern anomaly indicates that the frequency of Read and/or Write activity has exceeded the predefined threshold for the particular server and a particular one or more logical unit(s) (LUNs) of the particular storage device.

24. An apparatus as recited in claim 23, wherein the Read or Write access pattern anomaly indicates that the frequency of Read and/or Write activity has exceeded the predefined threshold for the particular server and one or more specified logical block address (LBA) range(s) of the particular storage device.

25. An apparatus as recited in claim 20, wherein the provided anomaly type is traffic pertaining to excessive login or control requests from the particular server in the SAN that have a frequency that exceeds a predefined threshold.

26. An apparatus as recited in claim 20, wherein the provided anomaly type is traffic that has an anomalous bandwidth usage by the particular server in the SAN that has exceeded a predefined threshold.

27. An apparatus as recited in claim 26, wherein the anomalous bandwidth usage corresponds to (i) data size per second and/or (ii) write or read (IO) operations per second.

28. An apparatus as recited in claim 20, wherein the provided anomaly type is a specified configuration change in the SAN that exceeds a predefined deviation level.

29. An apparatus as recited in claim 28, wherein the configuration change is selected from a group consisting of an I/0 size change, a stripe unit size change, a change in the number of servers, a service policy change, a change in the number of ports of the apparatus, a software change, and a change in a Read or Write flow sequence.

30. An apparatus as recited in claim 20, wherein the provided anomaly type is anomalous hardware behavior in the SAN.

31. An apparatus as recited in claim 30, wherein the anomalous hardware behavior includes an error report anomaly or a drop rate anomaly.

32. An apparatus as recited in claim 20, wherein the corresponding action includes logging and publishing the detected anomaly.

33. An apparatus as recited in claim 20, wherein the corresponding action include enabling SPAN (switched port analyzer) in the apparatus so that the detected anomaly is captured for off-line analysis by an analysis device.

34. An apparatus as recited in claim 20, wherein the corresponding action includes re-authenticating the particular server and the particular server is responsible or has caused the detected anomaly.

35. An apparatus as recited in claim 20, wherein the corresponding action includes disabling access for the particular server and such particular server is responsible or has caused the detected anomaly, wherein access by the particular server is disabled via an access control list (ACL) for the particular storage device.

36. An apparatus as recited in claim 20, wherein the corresponding action includes controlling the rate of the traffic on a link coupled to the apparatus on which the anomaly is detected.

37. An apparatus as recited in claim 20, wherein the corresponding action includes shutting down a link coupled to the apparatus on which the anomaly is detected.

38. An apparatus for detecting anomalies in a storage area network (SAN) comprising the apparatus, a plurality of servers, and a plurality of storage devices accessible by the plurality of servers, comprising:
means for providing an anomaly type and corresponding action to be performed when the anomaly type is detected for traffic received by the apparatus of the SAN and such received traffic pertains to a particular server of the SAN requesting that data be read to a particular storage device of the SAN or written to the particular storage device of the SAN, wherein the particular server of the SAN is logged into the particular storage device of the SAN;
means for monitoring traffic that is received by the network device sent from the particular server to the particular storage device so as to detect the provided anomaly type in the monitored traffic; and
means for performing the corresponding action when the provided anomaly type is detected.

39. A storage area network (SAN) system for detecting anomalies, comprising:
a plurality of network devices; and
a plurality of storage devices which are each accessible by one or more servers through at least one of the network devices,
wherein at least a first one of the network devices of the SAN network is operable to:
provide an anomaly type and corresponding action to be performed when the anomaly type is detected for traffic received by the first network device and such received traffic pertains to a particular server of the SAN network accessing or initiating access with a particular storage device of the SAN, wherein accessing and initiating access each include the particular server logging into the particular storage device of the SAN;
examine traffic that is received by in the first network device sent from the particular server to the particular storage device so as to detect the provided anomaly type in the examined traffic; and
when the provided anomaly type is detected, performing the corresponding action.

* * * * *